3,198,807
SUBSTITUTED CARBOXAMIDE INDOLES
AND INDOLINES
Michel Leon Thominet, Paris, France, assignor to Société
d'Etudes Scientifiques et Industrielles de l'Ile-de-France,
a society of France
No Drawing. Filed July 17, 1962, Ser. No. 210,555
Claims priority, application France, July 25, 1961,
869,013, 869,014
11 Claims. (Cl. 260—319)

This invention relates to substituted carboxamide indoles and the corresponding indolines of such indoles.

The substituted carboxamide indoles of the invention have the formula:

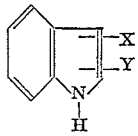

in which Y is a group having the formula:

—CONHWV in which V is a group having either of the formulas:

or

in which $R_1$ and $R_2$ are lower alkyl groups, such as the methyl, ethyl, propyl or isopropyl group; L is nitrogen, oxygen, the methylene group or a group having the formula NR, in which R is hydrogen, a lower alkyl group, such as the methyl or isopropyl group or a lower alkylsulfamoyl group; W is an alkylene group, such as the ethylene, propylene, methyl ethylene or 2-methyl propylene group; and X is a halogen, such as chlorine, bromine or fluorine, a lower alkoxy group, such as methoxy, ethoxy, isopropoxy or butoxy, a lower acyl group, such as, $COCH_3$ or $COC_2H_5$, a trihalomethyl, such as the trichloromethyl, tribromoethyl or trifluoromethyl group, and mercapto groups having the formula $SR_5$ in which $R_5$ is a lower alkyl group, such as the methyl or ethyl group.

The process of producing substituted carboxamide indoles of this invention involves the reaction of a lower alkyl ester of 3-hydroxy-2-indolylformic acid or a lower alkyl ester of 2-hydroxy-3-indolylformic acid with a lower alkylating agent in acetone in the presence of potassium carbonate, treating the resulting reaction product with the required disubstituted diamine in boiling toluene, recovering the alcohol formed in the course of the reaction, expelling the solvent, acidifying, reprecipitating the base by adding an alkali to the acid solution and forming a salt of the carboxamide by reacting in an inert solvent an acid with the dissolved base. For the hydrochloride, for instance, a stream of gaseous dry hydrogen chloride is caused to pass into an isopropyl alcohol solution of the base.

For example, the reaction of the preparation of the 3-methoxyindole-2-N-(diethylaminoethyl) carboxamide is indicated as follows:

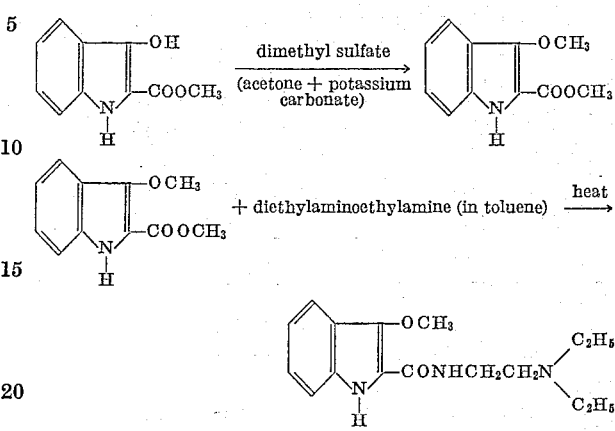

To obtain the corresponding indolines from the substituted carboxamide indoles, hydrogenation is effectuated in an autoclave under pressure and heat in the presence of a known catalyst such as platinum or palladium carbon in an inert solvent like alcohol. The solvent is expelled after hydrogenation and the residue is recrystallized. Salts of the substituted indoline base may be obtained by treating the base in solution in an inert solvent with the required acid. To obtain the hydrochloride, for example, the base is dissolved in isopropyl alcohol and a current of gaseous dry hydrogen chloride is passed into the alcoholic solution.

The substituted carboxamide indoles, the corresponding indolines and their salts of this invention possess significant pharmacological properties and may be used for the treatment of emesis associated with many conditions, such as pregnancy and seasickness, and behavior disturbances. For this purpose, the substituted indoles, substituted indolines or their salts may be incorporated in or combined with pharmaceutically acceptable carriers.

A more comprehensive understanding is obtained by reference to the following examples:

EXAMPLE I

*3-methoxyindole-2-N-(diethylaminoethyl)-carboxamide hydrochloride*

91 grams of methyl-3-methoxyindole-2-carboxylate and 103 grams of diethylaminoethylamine are dissolved in 160 cc. of toulene. The solution is heated to boiling, and the methanol formed in the course of the reaction, which requires 22 hours, is removed.

The resulting 3-methoxyindole - 2 - N - (diethylaminoethyl) carboxamide is dissolved in about 500 cc. of water, is acidified, and the aqueous acid solution extracted with ether. The base is precipitated by the addition of ammonia to the acid solution, is filtered and recrystallized in 95% ethanol. There are obtained 102 g. of a bright yellow product having a melting point of 117–118° C. The hydrochloride of that base is prepared by dissolving the base in isopropyl alcohol and passing into that solution 13 g. of gaseous dry hydrogen chloride. There are obtained 111 grams of 3-methoxyindole-2-N-(diethylaminoethyl) carboxamide hydrochloride having a melting point of 173–174° C.

EXAMPLE II

*3-ethoxyindole-2-N-(diethylaminoethyl)-carboxamide hydrochloride*

124 grams of ethyl-3-ethoxyindole-2-carboxylate and 126 grams of diethylaminoethylamine are boiled with 190 cc. of xylene for 22 hours. The alcohol formed in the course of the reaction is removed. The reaction product is dissolved in about 500 cc. of water, acidified, and the aqueous acid solution is extracted with ether. The base is precipitated by the addition of ammonia. By recrystallization in 95% ethanol, 125 grams of a white product is obtained, having a melting point of 141–142° C.

The hydrochloride of the base is prepared by dissolving this base in isopropyl alcohol and passing through it 15 grams of gaseous dry hydrogen chloride. There are obtained 132 grams of 3-ethoxyindole-2-N-(diethylaminoethyl) carboxamide hydrochloride having a melting point of 160–161° C.

EXAMPLE III

*3-ethoxyindoline-2-N-(diethylaminoethyl) carboxamide hydrochloride*

50 grams of 3-ethoxyindole-2-N-(diethylaminoethyl) carboxamide are dissolved in 200 cc. of 95% ethanol and hydrogenated in an autoclave under heat and pressure with 10 grams of palladium carbon as a catalyst. After hydrogenation is terminated, the catalyst is filtered, the alcohol evaporated and the residue recrystallized in isopropyl alcohol. There are obtained 40 grams of product, having a melting point of 90–91° C. The hydrochloride of that base is prepared by dissolving the base in isopropyl alcohol and passing through a current of gaseous hydrogen chloride. There are obtained 34 grams of 3 - ethoxyindoline-2-N-(diethylaminoethyl) carboxamide hydrochloride having a melting points of 151–152° C.

If a pharmaceutically acceptable salt other than the hydrochloride is desired, the substituted indole carboxamide or substituted indoline carboxamide base is reacted preferably under anhydrous conditions with the required acid. For example, such base may be reacted with sulfuric acid, tartaric acid or phosphoric acid.

The toxicities studied in male mice establish that the compositions of the examples each have a toxicity suitable for therapeutic use. The toxicities of the three compositions are given in the following table:

| Composition | $DL_{50}$ in mg. per kg. of body weight |
| --- | --- |
| Composition #1: 3-methoxyindole-2-N-(diethylaminoethyl) carboxamide | 40 |
| Composition #2: 3-ethoxyindole-2-N-(diethylaminoethyl) carboxamide | 37.5 |
| Composition #3: 3-ethoxyindoline-2-N-(diethylaminoethyl) carboxamide | 34 |

The antiemetic action of these compositions on the centers of vomiting has been studied in dogs in conjunction with apomorphine in accordance with the technique of Chen and Ensor as modified by Ducrot and P. Decourt. Four dogs were used in the test.

Each composition tested was administered subcutaneously 30 minutes before the administration of the 0.10 milligram of apomorphine per kilogram of body weight of the dog. The vomitings were counted for a 30 minute period following the injection of apomorphine. The results were as follows:

| Composition | Dosage of composition used | |
| --- | --- | --- |
| | Greater than 2.5 mg. per kg. of body weight, Percentage of protection | 2.5 mg. per kg. of body weight, Percentage of protection |
| #1 | 100 | 94 |
| #2 | 100 | 74 |
| #3 | 100 | 76 |

The antiemetic action appears to be maintained even when the pyrollic nucleus is hydrogenated. As indicated in the above table, the protection afforded with a dosage of 2.5 mg. per kilogram of body weight with composition #2 was 74%, while the corresponding substituted indoline had about the same or 76% protection. Desirably, the dosage is of the order of 1 to 5 mg. per kilogram of body weight.

Besides their antiemetic properties, the pharmacological study of these compositions showed experimentally significant antifribrillating effect.

The pharmacological results were confirmed by clinical testing in which the compositions were administered orally in 25 mg. tablets given in progressive dosages of 2 to 8 tablets daily. Such treatment gave no digestive or general manifestations of medicinal intolerance; the vomitings disappeared during the second day and did not reappear after the treatment. For example, composition #1 given in dosage of six 25 mg. tablets daily to a pregnant with uncontrolled heavy vomiting effected the cessation of vomiting at the end of 36 hours with no resumption after termination of the administration of the composition. Likewise, composition #2 administered at the rate of five 25 mg. tablets daily to an elderly cardiac patient having vomitings due to a treatment of digitalis effected the cessation of vomiting from the second day of such treatment.

A salt of the base, such as the hydrochloride salt, can be administered in the form of:

(a) Sugar coated 25 mg. tablets at the rate of 6 to 8 daily;
(b) Injectible ampoules or aqueous solutions for use in aerosol or other sprays in dosages of 100 mg. per 2 cc. of solution at the rate of 2 to 4 doses daily;
(c) Suppositories of 100 mg. at the rate of 2 to 4 daily;
(d) Granulated sucrose for babies at 10 mg. per dose, equivalent to one full level teaspoon (about 4 g.);
(e) Sugar syrup for babies at a dosage of 10 mg. per teaspoon of 5 cc.

The duration of the treatment and the dosages utilized vary with the illness treated. They would be determined by the physician.

What is claimed is:

1. A compound of the formula:

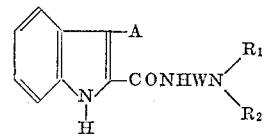

in which A is lower alkoxy; W is alkylene of 2–4 carbon atoms; and $R_1$ and $R_2$ are lower alkyl.

2. A non-toxic acid addition salt of a compound of the formula:

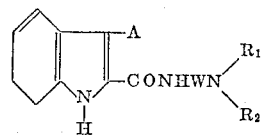

in which A is lower alkoxy; W is alkylene of 2–4 carbon atoms; and $R_1$ and $R_2$ are lower alkyl.

3. A compound of the formula:

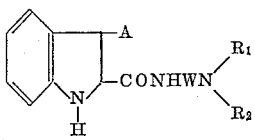

in which A is lower alkoxy; W is alkylene of 2–4 carbon atoms; and $R_1$ and $R_2$ are lower alkyl.

4. A non-toxic acid addition salt of a compound of the formula:

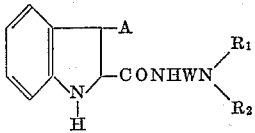

in which A is lower alkoxy; W is alkylene of 2–4 carbon atoms; and $R_1$ and $R_2$ are lower alkyl.

5. A non-toxic acid addition salt of 3-methoxyindole-2-N-(diethylaminoethyl) carboxamide.

6. A non-toxic acid addition salt of 3-ethoxyindole-2-N-(diethylaminoethyl) carboxamide.

7. A non-toxic acid addition salt of 3-ethoxyindoline-2-N-(diethylaminoethyl) carboxamide.

8. 3 - methoxyindole-2-N-(diethylaminoethyl) carboxamide hydrochloride.

9. 3-ethoxyindole - 2 - N-(diethylaminoethyl) carboxamide hydrochloride.

10. 3-ethoxyindoline-2-N-(diethylaminoethyl) carboxamide hydrochloride.

11. A compound selected from the class consisting of substituted indole carboxamides, non-toxic acid addition salts of said indole carboxamides, corresponding indoline carboxamides and non-toxic acid addition salts of said corresponding indoline carboxamides, said substituted indoles being of the formula:

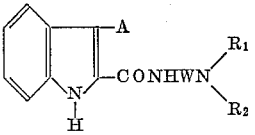

in which A is lower alkoxy; W is alkylene of 2–4 carbon atoms; and $R_1$ and $R_2$ are lower alkyl.

References Cited by the Examiner

UNITED STATES PATENTS

| | | | |
|---|---|---|---|
| 2,691,025 | 10/54 | Clinton et al. | 260—559 |
| 2,957,005 | 10/60 | Coenen et al. | 260—319 |
| 2,980,692 | 4/61 | Albertson | 260—319 |
| 2,986,573 | 5/61 | Topliss et al. | 167—65 |
| 3,004,889 | 10/61 | Kuna et al. | 167—65 |

OTHER REFERENCES

Elderfield: Heterocyclic Compounds, vol. 3, pp. 115–116 (1952).

Wormser et al.: J. Pharm. Sci., vol. 50, pp. 976–977 (1961).

NICHOLAS S. RIZZO, *Primary Examiner*.